United States Patent [19]

Jaffe

[11] 4,369,272

[45] Jan. 18, 1983

[54] PROCESS FOR PREPARING POLYOLEFIN RESIN EXTENDED PIGMENTS COMPRISING SALT MILLING CRUDE PIGMENT WITH THE RESIN

[75] Inventor: Edward E. Jaffe, Wilmington, Del.

[73] Assignee: E. I. Du Pont de Nemours and Company, Wilmington, Del.

[21] Appl. No.: 281,196

[22] Filed: Jul. 7, 1981

[51] Int. Cl.³ .......................... C08K 3/10; C08K 5/34; C08L 31/02; C09B 48/00

[52] U.S. Cl. .............................. 524/88; 106/288 Q; 106/309; 523/351; 523/205; 524/90; 524/423; 524/562; 524/563; 524/564; 524/570; 524/581

[58] Field of Search ...................... 260/42.21, 37 M; 106/288 Q, 309; 524/88, 90, 423, 501, 570, 562, 563, 564; 523/351

[56] References Cited

U.S. PATENT DOCUMENTS

| | | | |
|---|---|---|---|
| 2,999,862 | 9/1961 | Geiger | 524/88 |
| 3,360,497 | 12/1967 | Jones et al. | 260/41 |
| 3,437,503 | 4/1969 | Massam et al. | 106/309 |
| 3,565,880 | 2/1971 | Bradley et al. | 260/30.6 R |
| 3,586,247 | 6/1971 | Pervins | 241/16 |
| 3,600,354 | 8/1971 | Kunze et al. | 260/40 R |
| 3,674,736 | 7/1972 | Lerman et al. | 260/42.21 |
| 3,748,164 | 7/1973 | Ashiya et al. | 106/288 Q |
| 3,767,444 | 10/1973 | Zeisberger | 260/42.21 |
| 3,806,464 | 4/1974 | Matrick et al. | 252/316 |
| 3,991,007 | 11/1976 | Perronin et al. | 260/42.21 |
| 4,025,480 | 5/1977 | Larsen | 260/42.46 |
| 4,127,422 | 11/1978 | Guzi et al. | 260/42.51 |
| 4,196,016 | 4/1980 | Simon | 106/309 |
| 4,220,479 | 9/1980 | Huffner et al. | 106/288 Q |
| 4,257,951 | 3/1981 | Matrick | 106/309 |
| 4,287,000 | 9/1981 | Buckwalter | 106/309 |
| 4,298,399 | 11/1981 | Formica et al. | 106/309 |

OTHER PUBLICATIONS

Chem. Abst. 94-17123f, (1981), Du Pont, Ganci et al.

*Primary Examiner*—John C. Bleutge
*Assistant Examiner*—Herbert J. Lilling

[57] ABSTRACT

A process is disclosed for preparing resin extended pigments containing from 10% to 75% and preferably 20% to 50% by weight, based on the amount of pigment and resin present. The crude pigment and resin are comilled, such as in a ball mill, in a manner equivalent to that used to prepare pigmentary grade pigment from crude pigment. Liquids if they are present should not affect the free flowing nature of the mill powder. The resin is a polyolefin or a copolymer of ethylene and up to 25% of acrylic acid, methacrylic acid, vinyl acetate, or oxidized ethylene units preferably softening at from 80° to 140° C.

8 Claims, No Drawings

PROCESS FOR PREPARING POLYOLEFIN RESIN EXTENDED PIGMENTS COMPRISING SALT MILLING CRUDE PIGMENT WITH THE RESIN

BACKGROUND OF THE INVENTION

1. Field of the Invention

The present invention relates to a process for the production of resin extended pigments which exhibit improved dispersibility over the corresponding nonresin extended pigment in a variety of plastics applications.

Pigments are widely used in various types of polymeric media. The efficiency of a pigment as a color imparting substance is very dependent on the degree of pigment dispersion achieved in these media. Generally pigments are products having a very small particle size with a consequent tendency to form aggregates during their preparation. This tendency to form aggregates is particularly troublesome during the drying step used in the preparation of pigments. In order to overcome this tendency to form aggregates various methods have been used to prevent or minimize the formation of aggregates and thus enhance dispersibility of the pigment involved.

2. Prior Art

In U.S. Pat. No. 3,360,497 a series of pigment concentrates in polyolefins are disclosed for preparing fibers and films where a high degree of pigment dispersion is required. A pigment of reduced particle size is dispersed in water in a pebble mill in the presence of a surfactant. In a separate step the pigment dispersion is mixed with a low molecular weight polyolefin dissolved in a solvent to effect transfer of the pigment to the polyolefin-solvent phase. The low molecular weight polyolefin is then extended with a high molecular weight polyolefin, separated from the water and then dried.

U.S. Pat. No. 3,437,503 discloses salt milling a pigment together with a resinous substance such as rosin, chemically modified rosin or polymers or copolymers of alkyl vinyl benzenes.

U.S. Pat. No. 3,586,247 discloses preparation of resin extended pigments by grinding a mixture of pigment of pigmentary particle size and a normally solid carrier resin at a temperature above the melting point of the resin. On cooling a concentrate or resin extended pigment is obtained.

U.S. Pat. No. 3,748,164 discloses producing a pigment by grinding a mixture of crude organic pigment and an aminoplast tackifying agent selected from a group of certain urea derivatives with an inorganic salt grinding agent. Various additives such as liquids, surface active agents and solid resins can be included in the mixture.

U.S. Pat. No. 3,806,464 discloses a process of preparing a pigment encapsulated with an acrylic interpolymer by comilling the pigment, the acrylic interpolymer and a solvent for the acrylic interpolymer. After the comilling step the solvent is removed.

SUMMARY OF THE INVENTION

In the process of the present invention a resin extended pigment having improved dispersibility and having the pigment particles reduced to pigmentary size is prepared by comilling the crude pigment and a finely divided suitable resin. No solvent is used, but a small amount of a liquid phase directing agent or other liquids may be present.

DETAILED DESCRIPTION

The present invention is a process for the production of resin extended pigments of improved dispersibility, which process is characterized by requiring no additional step beyond those already employed in the process of particle size reduction for a given pigment. The desired resin is simply incorporated with the pigment in the particle size reduction step without additional additives or the expenditure of additional energy. The product is a highly dispersible pigment which is essentially equal in dispersibility and pigmentary strength to commercial resin extended pigments which have been resin extended after having their particle size reduced to pigmentary size. When using the dispersion milling process described in U.S. Pat. No. 4,024,154, the resin is simply included, either at the start or later in the milling process, with or without the use of a surfactant, and the milling operation carried out in the conventional manner.

The relative proportions of pigment and resin may vary widely depending on the intended use of the resin extended pigment. As little as 10% by weight resin, based on the resin extended pigment, has shown a distinct beneficial effect in some plastic systems. For beta copper phthalocyanine, extension with 25% by weight resin, has given a product which exhibits excellent dispersibility in polyvinyl chloride, being comparable or superior to commercially available resin extended beta copper phthalocyanine. Partially chlorinated copper phthalocyanine when extended with 35 or 40% resin exhibits outstanding dispersibility in polyethylene. In the case of beta quinacridone, 50% by weight, based on the resin extended pigment, has shown the greatest effect in terms of dispersibility and compares favorably with commercial resin extended pigments prepared by more costly processes. In terms of convenience and cost, the amount of resin used should be minimized; but the overriding consideration is dispersibility which is maximized in general at a resin extension in the range of 10% to 75% by weight based on the resin extended pigment, and preferably from 20% to 50% by weight, based on the resin extended pigment.

A wide variety of resins can be used in the process. Generally the resin should not melt under the milling operation which is carried out at temperatures as high as 65° C. Thus, preferably the resin should have a softening point above 75° C. The resin should be thermoplastic as used. A resin which is cross-linkable to form a thermoset can be used prior to being thermoset or cross-linked. The resin must be stable in hot dilute aqueous acid which is used for pigment ripening and to remove any metal which becomes incorporated in the resin extended pigment during the milling operation. Adequate stability in dilute acid means that the resin does not undergo significant deleterious degradation when subjected to a 1.5% solution of sulfuric acid at 90° C. for 2 hours. Any of a wide variety of resins can be used. The resin should be in a finely divided state such as a powder rather than being in the form of molding pellets. The pigment should be insoluble in the resin being used.

The preferred resins generally are homopolyolefins or copolymers such as polyethylene or an ethylene-acrylic acid copolymer which are soluble in most end-use media and very compatible with many plastic systems.

The resin need not be present during the entire milling operation, but should be added to the mill charge at least one hour prior to stopping the milling operation.

The most preferred resins are low molecular polymers of ethylene which may contain up to 25% by weight of a monomer selected from the class consisting of acrylic acid, methacrylic acid, vinyl acetate and oxidized ethylene units. These preferred resins have softening points as determined by ASTM E-28 of 80° to 140' C.

Milling, as used in this invention, means milling in the absence of liquids or, if liquids are used, such as a phase directing solvent, or a surface-active agent, they are present in such small amounts or are of such a nature that the pigment and resin retain the characteristics of a free flowing powder.

The conditions applicable to the milling operation are not especially critical. The mill loading is substantially conventional for ball milling operations. Thus, it is conventional for the charge of grinding media to occupy about half of the volume of the mill and for the material being ground to essentially occupy the voids between these media. It is quite possible to increase the charge with some increase in the milling time. The choice of these conditions is well within the skill of one versed in this type of operation. The preferred grinding media in the mills are the rod type, which may vary in size; but it is quite possible to use ordinary round steel balls varying from ⅛ inch in diameter up to ½ inch in diameter or more in the operation. When round balls are used there is a marked tendency for the charge to cake in the mill under some conditions, which tendency generally can be avoided by the addition of materials of an irregular shape, such as nails, to the charge. The use of the rod type grinding media usually avoids this caking.

It is impossible to set up limits as to the length of the milling cycle; since it will vary depending upon the pigment being treated, the milling loading, and the type of mill being used. In order to establish the optimum length of time for milling a particular pigment under a given set of conditions, it is recommended that the invention be run with variations in the milling time and the samples evaluated for the best balance of properties such as color strength and intensity and dispersibility. A minimum of 4-6 hours is usually required, and this may be extended to as much as 12-18 hours or even more in a commercial scale mill. Considerably longer times are required when using a laboratory or semi-works scale mill.

The preparation of resin extended or resin encapsulated pigment can also be carried out by milling the pigment and the resin in the presence of various inorganic salts such as sodium chloride, sodium sulfate or hydrated aluminum sulfate (alum). The preferred salt is Al$_2$(SO$_4$)$_3$.15-18H$_2$O, with or without an added solvent such as tetrachloroethylene, 1,1,1-trichlorethane, xylene, o-dichlorobenzene, etc. and with or without an anionic surfactant.

After the milling operation the resin extended pigment normally is ripened in a hot dilute acid such as 1.5% sulfuric acid at the same time any metal which has become associated with the resin extended pigment during milling is extracted. Following the extraction or ripening step the pigment is dried. In a conventional drying operation, pigment particle agglomeration occurs. In the present process some pigment particle growth occurs during the ripening step, but pigment particle agglomeration during drying is significantly reduced or avoided due to the presence of resin. Thus the resin extended pigments prepared by the process of the present invention are less agglomerated, more dispersible, and consequently their inherent transparency is easier to realize in an end use system.

Organic pigments generally are suitable for use in the process of the present invention. Such pigments include the various copper phthalocyanines including those polyhalogenated with chlorine and/or bromine, partially chlorinated alpha, and chlorine free beta, and gamma phase; alpha, beta and gamma quinacridone as well as substituted quinacridones such as 2,9-dimethylquinacridone, 2,9-dichloroquinacridone, 2,9-difluoroquinacridone, 4,11-dichloroquinacridone, 4,11-difluoroquinacridone, and quinacridonequinone; solid solutions of two or more quinacridones optionally with dihydroquinacridone such as described in U.S. Pat. No. 3,650,510; Indanthrone Blue, Flavanthrone, Thioindigo, and some monoazo and disazo pigments.

The presence of resin can inhibit particle size growth in the extraction step but despite smaller particle size, the resin extended pigments, prepared by the process of the present invention, exhibit better dispersibility than the same pigments which have not been resin extended.

When extending a pigment with a resin of low polarity such as polyethylene modified with acrylic acid, which is useful in plastic systems, the pigment coated by the resin in the milling operation is fairly hydrophobic, causing varying degree of particle growth retardation depending on the nature of the resin in the ripening or extraction operation and thus yielding products of smaller particle size in conjunction with outstanding dispersibility as a consequence of resin extension relative to pigment milled in the absence of resin. In processing of the resin extended pigment after an equilibrium particle size has been reached in the extraction operation, filtration and washing are exceptionally rapid due to the hydrophobic nature of the resin on the surface of the pigment particles affording economics in this essential product isolation step.

Resin extension also improves the heat stability of some pigments which otherwise undergo a partial or complete polymorphic change under the influence of heat when being incorporated with plastics such as polypropylene. Thus the red solid solution of 80% quinacridone and 20% 2,9-dimethylquinacridone has a definite tendency to become progressively bluer at elevated processing temperatures due to partial phase conversion of any quinacridone, not in solid solution, to the violet beta-quinacridone. In the case of the resin extended pigment of the present invention this change is significantly reduced. The improved thermal stability is readily apparent.

Improved vinyl dispersibility of a 50% resin extended beta-quinacridone or 2,9-dichloroquinacridone which at minimum work show a pigmented plastic with greater tinctorial strength and intensity but just as important fewer or no specks and streaks. The same is true for resin extended beta copper phthalocyanine pigments, and partially chlorinated copper phthalocyanine extended with about 35% resin based on the resin extended pigment.

DESCRIPTION OF THE PREFERRED EMBODIMENTS

In the following Examples all parts are by weight.

EXAMPLE I

A semi-works scale ball mill is charged with 1,000 parts "Cyl-Pebs" steel cylinders approximately ½" (1.27 cm) in diameter and ½" (1.27 cm) in length, 100 parts of "twenty penny" 4" (10 cm) nails, 11.1 parts crude beta-quinacridone, 43.5 parts of commercial aluminum sulfate $Al_2(SO_4)_3.15–18H_2O$, 0.53 part of the isopropylamine salt of dodecylbenzene sulfonic acid and 1.6 parts of tetrachloroethylene (phase control agent). The mill is rotated at a speed of 40 rpm (about 74% of the critical speed which is the speed at which the centrifical force overcomes the force of gravity so that the grinding balls are retained against the outer wall of the mill) for 8 hours at a temperature of about 50° C. The mill is opened and 11.1 parts of an ethylene/acrylic acid copolymer having softening point of 108° C., a density of 0.93 g/cc, a Brookfield viscosity at 140° C. of 500 cps (0.5 Pa.s), and an acid number of 40 mg KOH/g, is added to the mill and milling is continued for 2 hours; after which the contents of the mill is discharged through a screen which retains the "Cyl-Pebs" and nails. Then 0.66 part of the mill powder is added to a stirred solution made by adding 0.025 part of concentrated sulfuric acid to 1.8 parts of water maintained at 50° C. After adding the resin extended pigment the diluted acid is heated to 88–93° C. with stirring and kept at this temperature for two hours. The resin extended pigment is separated by filtration and washed with hot water until the filtrate is essentially acid free to litmus paper. After drying at 80° C. a fluffy violet powder is obtained. The product is characterized by outstanding dispersibility in polyvinyl chloride when tested in the following manner. White plasticized soft polyvinyl chloride (0.0485 part) was mixed with 0.00044 part of the resin extended pigment, prepared as above, in a small glass jar by stirring with a spatula and subsequent rolling of the jar for one minute on a roller mill. The resulting mixture is added to 0.44 parts of white plasticized soft polyvinyl chloride which has been softened by milling for 30 seconds on a two roll mill, the rolls of which are preheated to 150° C. and are rotating at 15 RPM. After 15 seconds of milling the charge is given five alternate cuts, and the material removed from the mill. The removed material is allowed to cool and small exhibits are cut from the center of the resulting sheet. The remainder of the sheet is returned to the mill for an additional 10 alternate cuts and exhibits are similarly prepared. Dispersibility is judged by degree of color development and the degree of speckling and streaking in the exhibit.

In terms of dispersibility the new product is fully equal to currently available commercial 50% resin extended product produced by more elaborate and expensive post particle size processing techniques.

EXAMPLE II

A mill is charged with 1500 parts of ½" (1.27 cm) diameter steel balls, 150 parts roofing nails, 135 parts aluminum sulfate pentadecahydrate, 12 parts crude gamma quinacridone, 3 parts crude 2,9-dimethylquinacridone, 3.9 parts 1,1,1-trichloroethane, and in a control run 0 part of copolymer, in a second run 3.8 parts of the copolymer of ethylene and acrylic acid used in Example I and in a third run 15 parts of the copolymer of ethylene and acrylic acid used in Example I. The mill charges are each ball milled for 72 hours at approximately 75% of critical speed. The balls and nails are separated with a screen and each of the dry powders are added separately to solutions of 6.9 parts of concentrated sulfuric acid in 500 parts of water which is stirred while heating at 80±2° C. for 2 hours. The products are isolated by filtration, washed with hot water until free of acid and sulfate, and dried. The individual products are evaluated in plasticized polyvinyl chloride using the 5 and 15 cut technique on a two roll mill. The product containing 20% ethylene/acrylic acid copolymer (3.8 parts) is very significantly stronger in tinctorial strength and exhibits considerably fewer specks and streaks than the control run. The sample containing 50% ethylene/acrylic acid copolymer and 50% solid solution of quinacridone and 2,9-dimethylquinacridone is even stronger in tinctorial strength than the 20% ethylene/acrylic acid copolymer and 80% solid solution sample and is virtually devoid of specks and streaks.

Eleven hundred parts of polypropylene are mixed at low speed with 11 parts of pigmentary titanium dioxide and 1.1 parts (based on toner content) of the pigment indicated in Table I in a Banbury mixer. The mixer speed is increased and the temperature raised to 140° C. at which point the polypropylene softens and a uniform blend of pigment and polypropylene is obtained. The resulting blend is chopped into coarse colored pellets which are then injection molded into three sets of chips at each of 205° C., 260° C. and 288° C. The degree of color change caused by being extruded at the two higher temperatures is reported in Table I on a scale of 1–10 where 1 is a nearly complete failure of the pigment, 2 is a severe color change, 8 is change and 10 is no change of color.

TABLE I

| | | Extrusion Temperature | | |
|---|---|---|---|---|
| | Pigment Composition | 205° C. | 260° C. | 288° C. |
| 1. | Particle size reduced gamma quinacridone | Bluish Red | 2 | 1 |
| 2. | Above control run pigment | Intense Bluish Red | 7 | 5 |
| 3. | Above 20% resin extended pigment | Higher Intensity Bluish Red | 9 | 8 |
| 4. | Above 50% resin extended pigment | Higher Intensity Bluish Red | 10 | 9 |

As can be seen from Table I, the resin extended pigments exhibit superior thermal stability.

EXAMPLE III

A ball mill is charged with 1500 parts of ½" (1.27 cm) diameter steel balls, 150 parts roofing nails, 135 parts aluminum sulfate pentadecahydrate, 15 parts crude beta copper phthalocyanine, 3.23 parts of 1,1,1-trichloroethane (phase control agent) and in a control run 0 part of copolymer, in a second run 5 parts of the ethylene/acrylic acid copolymer used in Example I, and in a third run 15 parts of the ethylene/acrylic acid copolymer used in Example I. The milling and extraction procedures are the same as described in Example II. The product milled without the ethylene/acrylic acid copolymer, when evaluated in plasticized polyvinyl chloride by the previously described 5 and 15 cut technique on a two roll mill is relatively weak in tinctorial strength and full of specks and streaks whereas the 25% (5 parts) and 50% (15 parts) ethylene/acrylic acid copolymer extended products are strong in tinctorial strength, showing little strength difference between 5 and 15 cuts, and are virtually devoid of specks and streaks.

EXAMPLE IV

A ball mill is charged with 1,000 parts Cyl-Pebs", 100 parts "twenty penny" nails, 50 parts of commercial Al$_2$(SO$_4$)$_3$.15-18H$_2$O, 1.4 parts tetrachloroethylene and 10 parts of a semi-chlorinated copper phthalocyanine pigment as prepared from a mixture of suitable amounts of 4-chlorophthalic acid, phthalic anhydride urea and cuprous chloride. The mill is rotated at a speed of 40 rpm (about 74% of the critical speed) for 12 hours at a temperature of 50-53° C. The mill is opened and 6.5 parts of an ethylene/acrylic acid copolymer having a softening point of 108° C., a density of 0.93 g/cc, a Brookfield viscosity at 140° C. of 500 cps (0.5 Pa.s), and an acid number of 40 mg KOH/g is added to the mill and milling is continued for 1½ hours; after which the contents of the mill are discharged through a screen which retains the "Cyl-Pebs" and nails. Five and ½ parts of the mill powder is added to a stirred solution made by mixing 0.88 part 50% sulfuric acid with 22 parts water which is heated to 80°-85° C. for 1 hour. After cooling to 65°-70° by dilution with cold water the product is filtered, washed with warm water until acid free, and dried at 70° C. The yield was 1.28 parts or 93.5% recovery.

The product is characterized by outstanding dispersibility in low density polyethylene when tested in the following manner. Film grade low density polyethylene (0.386 part) is added to a two roll mill, having two six inch (15 cm) rolls which are rotated at surface speeds of 35 and 45 feet per minute (10.7 and 13.7 meters per minute) respectively, and are heated to 66° C. and 121° C., respectively. When the low density polyethylene has softened, a previously prepared hand stirred mixture of 0.055 part powdered low density polyethylene and 0.0022 part (on a toner basis) of five alternate cuts and the material thoroughly incorporated by milling for 50-60 seconds. Then the charge is given five alternate cuts and the material is taken off the mill, allowed to cool and small exhibits (3" to 4") (7.6 cm to 10 cm) are cut from the center of the resulting sheet. The remainder of the sheet is returned to the mill for an additional five alternate cuts and an exhibit cut out. The same is repeated for 15 and 20 total cuts. The exhibits are separately pressed in a 3" by 5" (7.6 cm by 12.7 cm), 20 mil (0.05 cm) mold at 174° C. using polyethylene terephthalate film between the low density polyethylene and the metal of the mold. The pressed material is cooled before the film is removed. The resulting exhibits are visually examined under a microscope. The pigment is completely dispersed showing no appreciable amount of visible particles and is fully equivalent to a commercial resin extended pigment prepared by a different and costlier method.

A product prepared in a similar manner, but with a pigment which has not been resin extended shows large undispersed pigment aggregates.

The pigment can also be evaluated by determining the tinctorial strength of the pigment when dispersed in low density polyethylene. Low density polyethylene (0.44 part) is added to the two roll mill but the front roll is heated to 138° C. and the rear roll to 121° C. rotating at 45 and 35 feet per minute (13.7 and 10.7 meters per minute). When the low density polyethylene has softened 0.017 part of a 50/50 low density polyethylene white titanium dioxide pigment concentrate is added and given 5 alternate cuts to incorporate the white pigment. Then 0.00044 part (on a toner basis) of the pigment, prepared as above, is added and the material thoroughly incorporated for about one minute. Then the charge is given five alternate cuts and a center sample taken as described above followed by 10, 15 and 20 alternate cuts with a center sample being taken each time. The 3"×5" (7.62 cm by 12.7 cm) by 20 mil (0.05 cm) exhibits are pressed in a mold and the color strength compared. The tinctorial strength exhibited by the pigment is at least as great as that of commercial resin extended pigments.

I claim:

1. A process comprising salt milling a crude organic pigment wherein from 10 to 75 percent by weight, based on the amount of pigment and resin present, of a thermoplastic resin selected from the class consisting of polyolefins and copolymers of ethylene with up to 25 percent by weight of a monomer selected from the class consisting of acrylic acid, methacrylic acid, vinyl acetate and oxidized ethylene units, is comilled with said pigment for at least one hour while maintaining said pigment and said resin in a finely divided free flowing state, and recovering a resin extended pigment of pigmentary particle size.

2. The process of claim 1 wherein the salt used to salt mill is Al$_2$(SO$_4$)$_3$.15-18H$_2$O.

3. The process of claim 2 wherein the pigment is quinacridone or a derivative thereof, or a solid solution of two or more quinacridones, or copper phthalocyanine or a halogenated copper phthalocyanine.

4. The process of claim 3 wherein the resin is a polymer of ethylene containing up to 25% by weight of a monomer selected from the class consisting of acrylic acid, methacrylic acid, vinyl acetate, and oxidized ethylene.

5. The process of claim 4 wherein the resin is comilled with the pigment from an intermediate point during the milling operation.

6. The process of claim 5 wherein the amount of resin is 20 percent by weight to about 50 percent by weight, based on the amount of pigment and resin present.

7. The process of claim 6 wherein the comilling is done at a temperature below 65° C.

8. The process of claim 7 wherein the resin has a softening point of from 80° to 140° C.

* * * * *